United States Patent
Gadson

(10) Patent No.: US 11,666,151 B1
(45) Date of Patent: Jun. 6, 2023

(54) ACCESSORY APPARATUS FOR HAIR STYLING CHAIR

(71) Applicant: Tezaila D Gadson, Tallahassee, FL (US)

(72) Inventor: Tezaila D Gadson, Tallahassee, FL (US)

(*) Notice: Subject to any disclaimer, the term of this patent is extended or adjusted under 35 U.S.C. 154(b) by 0 days.

(21) Appl. No.: 17/219,806

(22) Filed: Mar. 31, 2021

(51) Int. Cl.
- A47C 1/11 (2006.01)
- A47C 7/38 (2006.01)
- A47C 7/72 (2006.01)
- F16M 13/02 (2006.01)

(52) U.S. Cl.
CPC .......... *A47C 1/11* (2013.01); *A47C 7/38* (2013.01); *A47C 7/727* (2018.08); *F16M 13/02* (2013.01)

(58) Field of Classification Search
CPC .. A47C 1/11; A47C 7/38; A47C 7/727; F16M 13/02
USPC .... 297/397, 394, 399, 400, 401, 402, 217.6, 297/217.3
See application file for complete search history.

(56) References Cited

U.S. PATENT DOCUMENTS

| | | | | |
|---|---|---|---|---|
| 3,035,865 A | * | 5/1962 | Schirmer | A45D 20/32 297/391 |
| 5,953,768 A | * | 9/1999 | Jarosz | A45D 19/04 4/522 |
| 8,646,842 B2 | * | 2/2014 | Barfuss | A47C 1/06 297/393 |
| 9,150,130 B2 | * | 10/2015 | Jackow | B60N 2/806 |
| 10,681,986 B1 | * | 6/2020 | Sanders | A45D 44/10 |
| 2010/0148550 A1 | * | 6/2010 | Kidd | B60N 2/818 381/86 |
| 2016/0101716 A1 | * | 4/2016 | Brecht | B64D 11/0646 29/428 |

FOREIGN PATENT DOCUMENTS

DE   10241132 A1 * 3/2004 ........... B60N 2/4876

* cited by examiner

Primary Examiner — Milton Nelson, Jr.
(74) Attorney, Agent, or Firm — Alfred F Hoyte, Jr.

(57) ABSTRACT

An accessory apparatus for connecting to a salon chair is provided. The apparatus connects to the base of the chair and includes a hinged brace for stability. The distal end of the apparatus includes a removable headrest and is configured for attachment to a number of items. Electrical cables are included in the apparatus and may be connected to a source of electrical power or data to drive various devices. One or more electrical/data outlets are provided on extensions connectable to the apparatus.

5 Claims, 2 Drawing Sheets

ACCESSORY APPARATUS FOR HAIR STYLING CHAIR

1. FIELD OF THE INVENTION

The present invention generally relates to barbers and beauticians. More specifically, the present invention relates to an accessory apparatus for a salon chair.

BACKGROUND OF THE INVENTION

Accessories for barbers and stylists are well known. While there are many tools of the trade one constant is the chair for clients. These chairs, variously called salon chairs, barber chairs, or styling chairs, are similar for both men and women clients as they are designed to position the client for the various treatments applied to cut, wash, and style the hair. The chairs tend to have mechanisms for raising and lowering the client. Most chairs do not have a headrest because the clients hair will be pressed against the headrest. Also, as the client is typically in the chair for an extended period of time, there is no place to put personal items, especially electronics such as phones.

As is known in the art, there are many head positions for treating a client's hair. While working on the top and sides of the head, the client can be provided a temporary head rest for styling. This head rest should be completely removable to allow the client to tilt their head back for, e.g., washing and treating the back of the head. While removable head rests for styling chairs are known, they are generally centrally mounted on a telescoping pole that can be adjustably positioned for height. The pole is sized for fit into a bore formed in the chair back and thus only allows for vertical adjustment. Also, the pole is sized for fit with one brand and model of chair, and cannot be retrofitted onto an existing chair.

Barbers/stylists are often itinerant and space at salons is often limited, especially when using a space used by others. Accordingly, there is a need for an apparatus which allows stylists to temporarily store equipment and supplies, while also affording clients a place to rest or place personal items.

In accordance with the above, there is a need for an accessory holder/headrest apparatus connectable to a stylist's chair.

An accessory apparatus for connecting to a salon chair is provided. The apparatus connects to the base of the chair and includes a hinged brace for stability. The distal end of the apparatus includes a removable headrest and is configured for attachment to a number of items. A retractable tray can be positioned to temporarily store clients belongings or for food and drink. Electrical cables are included in the apparatus and may be connected to a source of electrical power or data to drive various devices which are secured in a bracket assembly. One or more electrical/data outlets are provided on extensions connectable to the apparatus. A plurality of hooks are provided on the apparatus to facilitate positioning supplies.

SUMMARY OF THE INVENTION

It is a major object of the invention to provide an accessory apparatus for a salon chair.

It is another object of the invention to provide an accessory apparatus for a salon chair that includes a headrest.

It is another object of the invention to provide an accessory apparatus for a salon chair that is removably attachable to the base of the salon chair.

It is another object of the invention to provide an accessory apparatus for a salon chair that has a powered accessory arm.

It is another object of the invention to provide an accessory apparatus for a salon chair that has a powered accessory arm.

DETAILED DESCRIPTION

Figure 1:
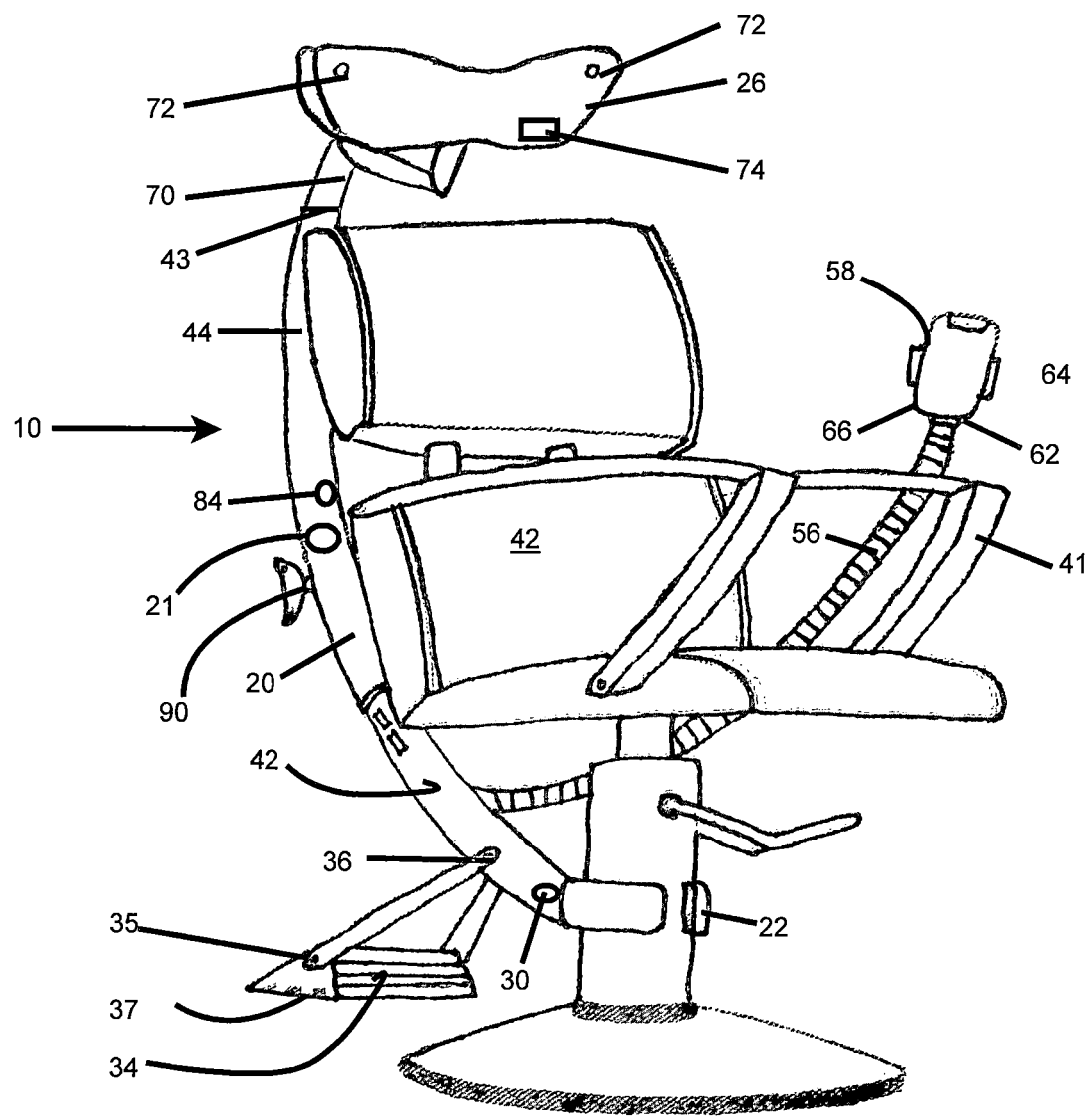
FIG. 1 is a perspective view of an accessory apparatus for a salon chair.
Figure 2:
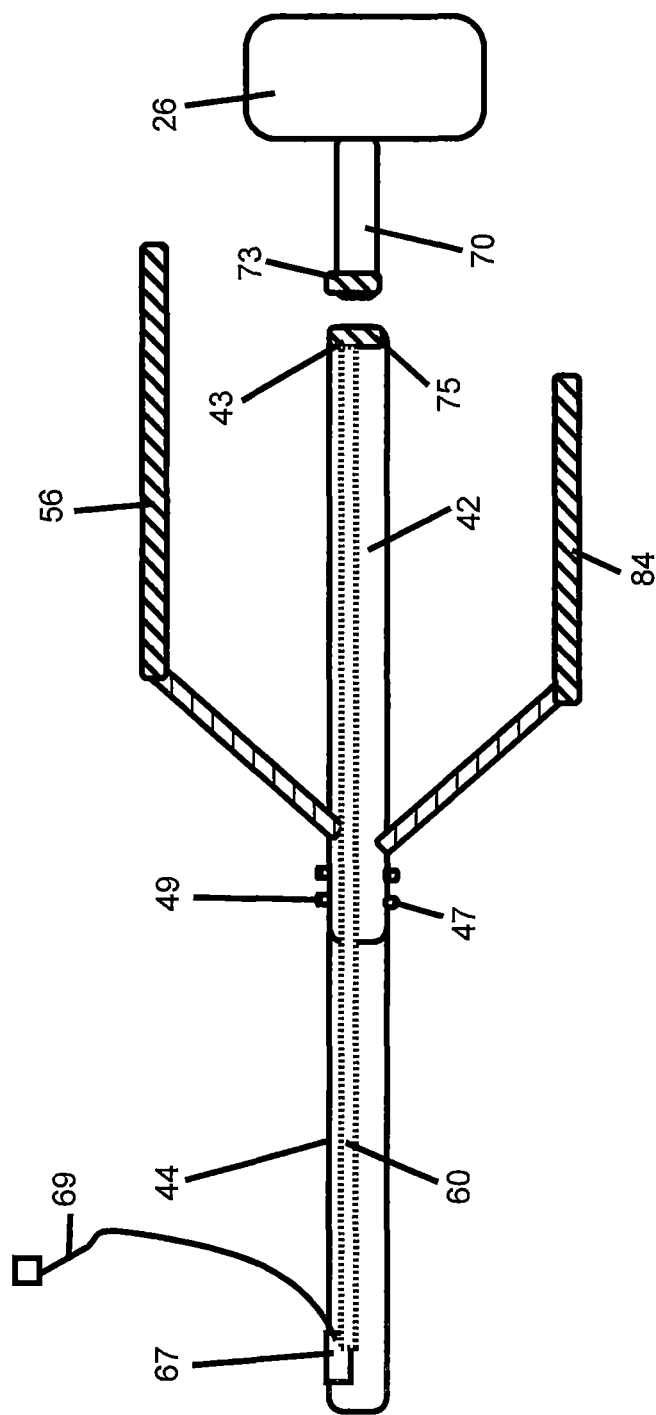
FIG. 2 is a side view, partly in section, detailing a component of the apparatus.

Referring now to FIGS. 1 and 2, the inventive apparatus, generally indicated by the numeral 10, is shown. It can be seen that the apparatus 10 has an elongated curved main support 20 having a connector 22 at one end 24 and a removable headrest 26 at the opposing end 28. The connector 22 is preferably an adjustable clamp having e.g., a bolt 30 for adjusting the diameter of the clamp to secure upon a rod or other cylindrical member in the well known manner. Other adjustable clamping members as would be apparent to one of skill in the art may be used.

A pivotable kick stand/brace 34 extending from the main support provides stability so that the apparatus 10 can be weight bearing. The brace 34 can be pivoted from a storage position substantially parallel to the main support 20 to a deployed position as shown in FIG. 1. In the deployed position the lower portion 35 of the brace 34 is in contact with the floor 12, the lower portion including high friction material 37 such as rubber to improve stability and traction of the apparatus 10 by reducing slippage. The lockable hinge mechanism 36 can be set to at least 3 lockable positions, which allows the brace 34 to be deployed at different angles to affect the height and position of the opposing end 28 of the apparatus 10, the mechanism 36 being one of any well known lockable pivot joint configurations.

The main support 20 is arched so as to avoid coming into contact with the chair 40 (to accommodate the contours of various makes and models of chairs), and has a lower component 42 and an upper component 44. The combination of a curved main support 20 and the brace 34 allow for positioning the apparatus 10 on virtually any salon chair, as the support 20 can be angled away from any protruding components of the chair 40. The support 20 may also include a hinge 21 in either upper 42 or lower component 44 to allow for bending the support 20 around the contours of the chair, the hinge 21 being lockable in discrete positions to further adjust the angle of support 20. The support 20 may be made of any high strength rigid material such as metal or plastic. The upper component 44 is slidably received into the lower component 42 to allow for both collapsing the apparatus 10 for storage and, in cooperation with brace 34, adjust the height of the headrest 26. A pair of bolts 47 and corresponding nuts 49 are used to set the relative positions of upper 42 and lower 44 components, with alignable apertures formed in components 42, 44 allowing bolts 47 to prevent relative motion of the components in the well known manner. Other locking telescoping mechanisms may be used here as would be apparent to one of skill in the art. Thus, by adjusting the angle of the brace 34, the length of upper component 44, and the angle of support 20 by way of hinge 21, positioning the headrest 26 directly behind the chair 40 in a functional position is facilitated.

An arm 56 extends from the main support, the arm being segmented 20 and articulated to allow for positioning a receiving cradle 58 formed at its distal end. The arm 56 allows for positioning around the contours of the chair 40 such as armrests 41. The upper 42 and lower components 44 are hollow to allow for electrical cables 60 to be threaded therethrough. The cables 60 may be both data and power cables. The power cables 60 may be low voltage to avoid a shock hazard. If cables capable of handling 120V AC are used, care must be taken to provide proper insulation. The cradle 58 preferably includes a USB terminal 62 electrically connected to cables 60 through internal wiring (not shown) to allow for charging and data connection with virtually any electronic device but especially smartphones via terminal 67 as explained below. The sides 64 of the cradle 58 may be adjustably spaced to allow for clamping onto a device, with the bottom ledge 66 also helping to secure the device in position by providing a horizontal surface upon which the device can rest.

A connecting terminal 67, which is a universal terminal having both a female USB terminal and at least one female analog (headphones) terminal, is provided on the lower component 42, the terminal 67 electrically connected to cables 60. Terminal 67 may also include an imbedded AC power terminal for connection to an AC power outlet using a common extension cord. The terminal 67 can be electrically connected to a USB charger (not shown) via USB to USB cable 69 so that a user device such as a smartphone can be plugged into terminal 67 for charging using a USB cord. Thus, a user device may be plugged directly into terminal 67, or optionally terminal 62 in cradle 58. The analog portion of terminal 67 is configured as a standard headphone jack so that a user may plug the audio out from a device into terminal 67, and the signal can be sent to speakers or headphones via cables 60. Connecting terminal 67 may also be connected to an external source of AC or DC power to drive devices connected to upper end 42 of the apparatus 10.

Headrest 26 includes a short connecting tube 70 which is sized for insertion into upper component, the upper end 43 of which is open. The headrest 26 may include speakers 72 and a microphone 74 to allow the user to use a smartphone hands free. Terminals 75 disposed interiorly of the upper end 43 of the upper component are electrically connected to cables 60 and terminal 67. Tube 70 has male contacts 73 for insertion into terminals 75. Terminals 75 are female receptacles for a standard headphone jack, so that any device connected to the analog part of terminal 67 can send an analog audio signal (via cables 60) to headrest speakers 72, or a pair of headphones, the device also capable of receiving analog signals from microphone 74. The connection between the device and the microphone 74 and speakers 72 may be Bluetooth® or other wireless protocol, provided the headrest 26 or speakers have a rechargeable power source and are Bluetooth compatible.

A support surface or tray 80 is attached to the main support 20, the tray 80 providing a support surface for personal items, food, or drink. To that end, a cup holder 82 may be provided. The tray 80 is attached by an articulated arm 84, which may also be telescoping, to position the tray around the contours of the chair 40, with connecting arms being disposed on either side of the tray 80 for stability.

The apparatus 10 also includes a number of hooks 90. Hooks 90 may be used to hang various stylist/barber supplies for convenient use while styling a client's hair. At least one hook 90 should be positioned near the headrest 26 to be used for hanging hair to be applied to the client, another positioned to hang a purse or the like.

In use, after clamping the main support 20 to the upstanding portion 81 of the base 8 of the chair 40, the headrest 26, brace 34, and arm 56 are adjusted as discussed above to position the headrest 26 and client device (via arm 56) as needed. As stated above, any attachment may be used in place of the headrest 26. For example, a scalp massaging device may be attached in place of the headrest 26, with cables 60 providing electrical power via connecting tube 70 and terminals 67 and 75. For storage, the upper component 44 may be recessed into the lower component 42, and the brace 34 can be moved to a storage position parallel to the lower component 42. The headrest 26 may be removed for storage.

I claim:

1. An apparatus for attachment to a salon chair comprising:
    an elongated hollow main support having an upper and lower component;
    said main support including power and data cables disposed therein, said cables connected to one or more terminals disposed on or connected to said main support to allow for electrical connection of devices to said apparatus;
    the upper component having an upper end which is open ended, the upper end having electrical contacts positioned therein;
    a connector connected to an end of the lower component, the connector releasably connectable to said chair, and a brace connected to the lower component;
    the upper component slidably receivable within said lower component;
    an accessory arm extending from said main support; and,
    a headrest removably positioned on said upper component, said headrest having a connecting tube including electrical contacts for connecting to said terminals disposed on said main support.

2. The apparatus of claim 1 wherein said brace can be set at discrete angles relative to said lower component to adjust height and position of said headrest.

3. The apparatus of claim 1 wherein said headrest includes speakers and a microphone.

4. The apparatus of claim 1 wherein said upper component has an open upper end, and said headrest is inserted into said upper end by a connecting tube.

5. The apparatus of claim 1 wherein said accessory arm is articulated and is attached to a support surface.

* * * * *